US012732791B2

(12) United States Patent
Jensen

(10) Patent No.: US 12,732,791 B2
(45) Date of Patent: Sep. 8, 2026

(54) SYSTEMS AND METHODS FOR PROACTIVELY TRANSITIONING ROAMING USER EQUIPMENT TO ITS HOME NETWORK

(71) Applicant: T-Mobile Innovations LLC, Overland Park, KS (US)

(72) Inventor: Daniel C. Jensen, Olathe, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 263 days.

(21) Appl. No.: 18/454,660

(22) Filed: Aug. 23, 2023

(65) Prior Publication Data

US 2025/0071538 A1 Feb. 27, 2025

(51) Int. Cl.
*H04W 8/12* (2009.01)
*H04W 8/04* (2009.01)

(52) U.S. Cl.
CPC ............... *H04W 8/12* (2013.01); *H04W 8/04* (2013.01)

(58) Field of Classification Search
CPC .................................. H04W 8/12; H04W 8/04
See application file for complete search history.

(56) References Cited

U.S. PATENT DOCUMENTS 8,131,283 B1 * 3/2012 Vargantwar ........... H04W 36/14 455/433
8,270,966 B1 * 9/2012 Vargantwar ........... H04W 48/18 455/423
2005/0037755 A1 2/2005 Hind et al.
2006/0052113 A1 3/2006 Ophir et al.
2010/0248640 A1 9/2010 MacNaughtan et al.
2012/0077488 A1 3/2012 Unger et al.
2012/0258709 A1 * 10/2012 Swaminathan ....... H04W 48/18 455/433
2014/0031035 A1 1/2014 Tagg et al.
2018/0213078 A1 7/2018 Visuri et al.
2019/0037484 A1 1/2019 Davies et al.
2019/0182655 A1 * 6/2019 Gupta ................. H04W 12/102

(Continued)

FOREIGN PATENT DOCUMENTS

CN 113052308 A 6/2021

OTHER PUBLICATIONS

First Office Action dated Feb. 12, 2026, U.S. Appl. No. 18/500,557, filed Nov. 2, 2023.

(Continued)

*Primary Examiner* — Nizar N Sivji

(57) ABSTRACT

A method for transitioning a roaming user equipment (UE) to its home network. The method includes detecting by a roaming transition manager the presence of the UE in an idle state, and detecting by the roaming transition manager that a signal strength of a roaming connection established between the UE and a visited network of the user is less than a predefined threshold. The method additionally includes triggering by the roaming transition manager, the UE to search for an access node of a home network of the user within range of the UE. The method further includes terminating the roaming connection in response to locating an access node of the home network within range of the UE, and establishing a home connection between the UE and the home network in response to locating the access node of the home network within range of the UE.

20 Claims, 11 Drawing Sheets

(56) References Cited

U.S. PATENT DOCUMENTS

| | | | | |
|---|---|---|---|---|
| 2019/0215250 | A1 | 7/2019 | Báder et al. | |
| 2020/0084829 | A1* | 3/2020 | Tang | H04W 36/0011 |
| 2020/0236527 | A1 | 7/2020 | Sood et al. | |
| 2021/0092791 | A1* | 3/2021 | Jeong | H04W 76/22 |
| 2021/0297940 | A1 | 9/2021 | Prakasam et al. | |
| 2022/0225075 | A1* | 7/2022 | Shao | H04W 12/069 |
| 2023/0300595 | A1 | 9/2023 | Dudar et al. | |
| 2023/0396980 | A1 | 12/2023 | Kanchiraju et al. | |
| 2024/0340633 | A1 | 10/2024 | Ahluwalia et al. | |
| 2025/0024244 | A1 | 1/2025 | Chong et al. | |
| 2025/0063452 | A1 | 2/2025 | O'Hurley et al. | |
| 2025/0150803 | A1 | 5/2025 | An et al. | |
| 2025/0247685 | A1 | 7/2025 | An et al. | |
| 2025/0247686 | A1 | 7/2025 | An et al. | |

OTHER PUBLICATIONS

An, Kyeong Hun. et al., "Roaming Data Capturing Via Subscriber Identity Module (SIM) Applet," filed Nov. 2, 2023, U.S. Appl. No. 18/500,557.

An, Kyeong Hun. et al., "Roaming Management by SIM Applet," filed Jan. 30, 2024, U.S. Appl. No. 18/427,705.

An, Kyeong Hun. et al., "Returning Attachment of a Communication Device to a Home Wireless Communication Network Based on Geo-location," filed Jan. 30, 2024, U.S. Appl. No. 18/427,710.

First Office Action dated Mar. 12, 2026, U.S. Appl. No. 18/427,710, filed Jan. 30, 2024.

Notice of Allowance dated Jun. 5, 2026, U.S. Appl. No. 18/500,557, filed Nov. 2, 2023.

Office Action dated Jun. 5, 2026, U.S. Appl. No. 18/427,705, filed Jan. 30, 2024.

* cited by examiner

SYSTEMS AND METHODS FOR PROACTIVELY TRANSITIONING ROAMING USER EQUIPMENT TO ITS HOME NETWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

User equipment (UE) in the form of mobile communication devices are capable of roaming between different networks provisioned by different network providers. For example, a user may subscribe or otherwise contractually obtain (such users being referred to herein as "subscribed users") access for their UE to a first or home network provisioned by a first or home network provider. In addition to obtaining access for the UE to the home network, the user may also obtain access for the UE to additional networks provisioned by other network providers without needing to subscribe to these additional networks. Instead, the user may freely and automatically roam (e.g., automatically obtain access for the UE) to these additional networks via prearranged agreements made between the home network provider and the other network providers provisioning these additional networks whereby the user may enjoy uninterrupted connectivity of their UE even in locations in which it is not possible to access the home network (e.g., locations out of range of each functional access point of the home network).

SUMMARY

In an embodiment, a method for transitioning a roaming user equipment (UE) to its home network is disclosed. The method includes detecting by a roaming transition manager executing on UE of a user the presence of the UE in one of an idle state and a reduced bandwidth state, and detecting by the roaming transition manager that a signal strength of a roaming connection established between the UE and a visited network of the user is less than a predefined threshold. The method additionally includes triggering by the roaming transition manager, with the UE in one of the idle state and the reduced bandwidth state and in response to the detection of the signal strength of the roaming connection being less than the predefined threshold, the UE to search, using a radio transceiver of the UE, for an access node of a home network of the user within range of the UE. The method further includes terminating the roaming connection between the UE and the visited network in response to locating an access node of the home network within range of the UE, and establishing a home connection between the UE and the home network in response to locating the access node of the home network within range of the UE.

In an embodiment, another method for transitioning a roaming user equipment (UE) to its home network is disclosed. The method includes detecting by a roaming transition manager executing on UE of a user the presence of the UE in one of an idle state and a reduced bandwidth state, and ascertaining by the roaming transition manager an identifier of an access node of a visited network through which the UE has established a roaming connection with the visited network. The method additionally includes determining by the roaming transition manager a location of the access node using the identifier of the access node by consulting an access node map, and triggering by the roaming transition manager, with the UE in one of the idle state and the reduced bandwidth state and in response to determining the location of the access node falls within a home network coverage zone the UE, to search, using a radio transceiver of the UE, for an access node of a home network of the user within range of the UE. The method further includes terminating the roaming connection between the UE and the visited network in response to locating an access node of the home network within range of the UE, and establishing a home connection between the UE and the home network in response to locating the access node of the home network within range of the UE.

In an embodiment, another method for transitioning a roaming user equipment (UE) to its home network is disclosed. The method includes detecting by a roaming transition manager executing on UE of a user the presence of the UE in one of an idle state and a reduced bandwidth state, and determining by the roaming transition manager a location of the UE using a location module of the UE. In addition, the method includes triggering by the roaming transition manager, with the UE in one of the idle state and the reduced bandwidth state and in response to determining that the location of the UE falls within a home network coverage zone the UE, to search, using a radio transceiver of the UE, for an access node of a home network of the user within range of the UE. Further, the method includes terminating a roaming connection established between the UE and a visited network in response to locating an access node of the home network within range of the UE, and establishing a home connection between the UE and the home network in response to locating the access node of the home network within range of the UE.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
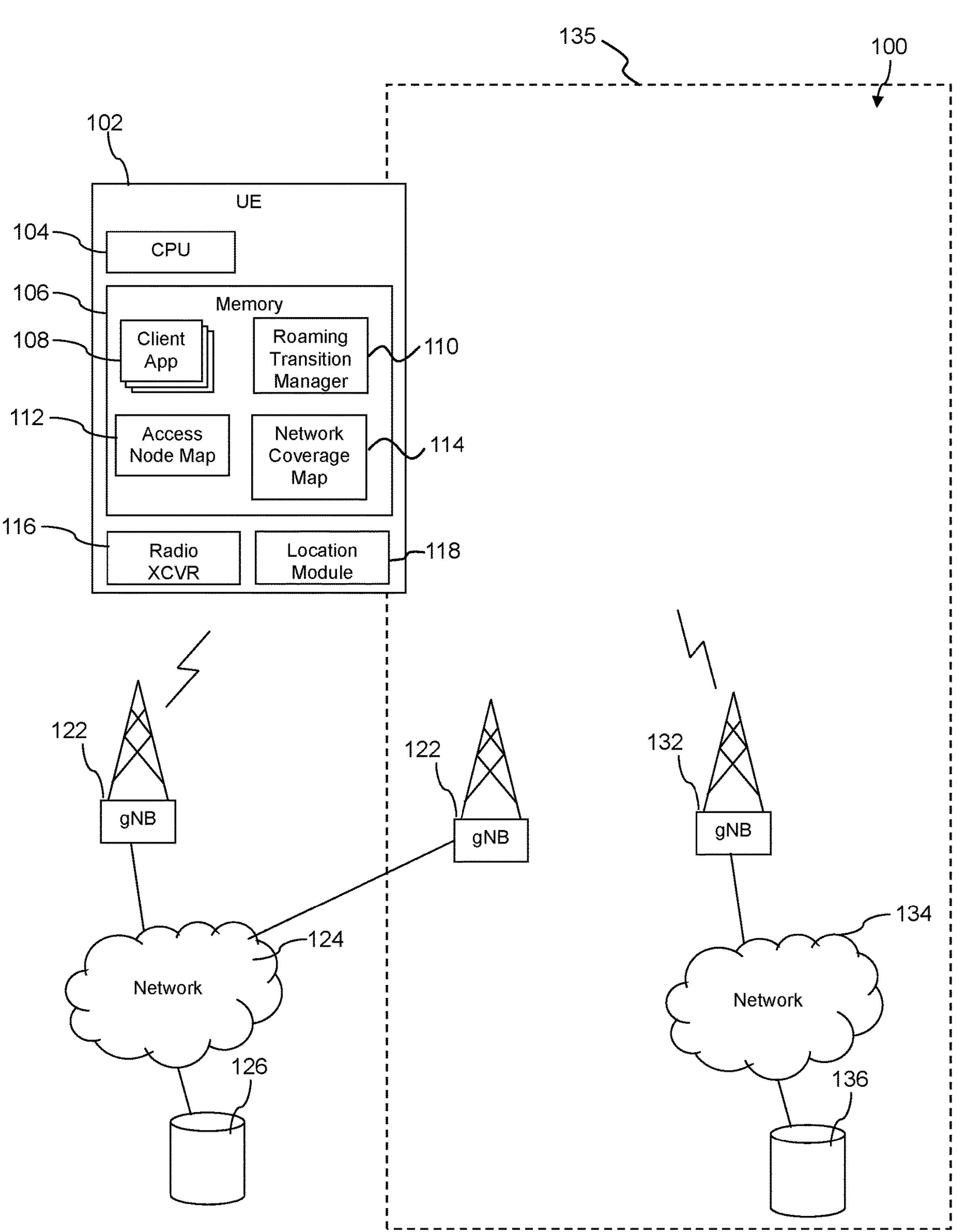
FIGS. 1 and 2 are block diagrams of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As described above, via prearranged agreements made between different network providers, a user having arranged for access to a home network provisioned by a home network provider (e.g., via an agreement made between the user the home network provider), the user may both access the home network provisioned by the home network and roam onto additional or visited networks provisioned by other or visited network providers via preestablished roaming agreements between the home network provider and the visited network providers provisioning the visited networks. As an example, in some instances, a user may attempt to utilize their UE (e.g., access features of their home network) in a location out of range of any functional access node of the home network. In such a scenario, the UE may automatically scan for access points of visited networks provisioned by visited network providers other than the home network provider to allow the UE to roam onto one of the visited networks.

In some instances, the UE may scan for access points belonging to one or more visited networks provisioned by visited network providers identified in a roaming list or similar document stored on a memory device of the UE. The roaming list identifies visited networks having preestablished roaming agreements with the home network provider. Additionally, the roaming list identifies the wireless frequency bands associated with visited networks identified on the roaming list such that the UE may determine which frequency bands to scan when searching for access points of visited networks identified on the roaming list of the UE. It may be understood that different network providers are permitted access to different and non-overlapping wireless frequency bands (e.g., radio frequency bands) to permit the different networks provisioned by these different network providers to operate freely without interference from other networks operating at frequency bands which do not overlap with the frequency band of the respective network. For example, the home network may access and utilize a first frequency band, a first visited network may access a second frequency band distinct from the first frequency band, a second visited network may access a third frequency band distinct from both the first and second frequency bands, and the like.

Upon locating a functional access point of a network having a roaming agreement with the home network of the user (e.g., a network identified in a roaming list stored on the UE of the user), the user's UE may automatically connect or roam onto the respective network whereby the UE connects to the respective network via the located access point. In this manner, the user may enjoy network connectivity, including potentially access to features of their home network (e.g., applications stored on servers hosted by home network) via the roaming connection formed between the UE and the visited network. The connection formed between the UE and the visited network may be made automatically and seamlessly from the perspective of the user such that, for example, network connectivity of the user's UE is not lost as the UE enters a location in which signal connectivity is lost between the UE and each of the functional access points of the home network.

While a roaming connection formed between the user's UE and a visited network to which the user has not subscribed provides access to the user of the visited network, users roaming on a visited network are often not provided with the same features and capabilities as the subscribed users of the respective visited network. For example, the bandwidth or other Quality of Service (QOS) parameters of non-subscribed users (referred to herein as "roaming users") of the visited network may be throttled or limited relative to subscribed users of the visited network. Additionally, access to specific features or functions of the visited network may be limited to subscribed users only such that they cannot be accessed by roaming users. Thus, the experience of a given roaming user may not be of the same quality (e.g., as a result of throttled QoS parameters for roaming users) as the experience of the user on their home network.

In addition, the home network provider of the respective user may undesirably incur penalties resulting from the user's access to a visited network in a roaming state or capacity. Particularly, a home network provider may be required to compensate, as part of a roaming agreement between the home network and a visited network, the visited network for bandwidth consumed by a roaming user (subscribed to the home network) on the visited network. Thus, it is desirable for both the user in maximizing the quality of experience thereof, and for the home network provider in minimizing associated roaming expenses, to transition the user from the visited network to the home network as soon as practicable.

Conventionally, a UE that is roaming is generally configured to initiate a predefined countdown or timer (e.g., a timer having a fixed duration that is between five minutes and ten minutes in length) upon the UE entering an idle state or mode. As used herein, the term "idle state" with respect to UE refers to a state of the UE in which the UE is not actively sending or receiving information. The roaming UE will automatically scan, using a radio transceiver of the UE, for access nodes of the user's home network in response to the completion of the timer (e.g., in response to the timer reaching zero). For example, the roaming UE may automatically scan the frequencies corresponding to the home network (e.g., as referenced from a roaming list stored on the UE) in search of an access point of the home network that is currently within range of the UE. The scanning for access points of the home network may continue in some instances for a predefined period of time (e.g., a "scanning period") until either an access point of the home network has been located whereby the UE may automatically connect to the home network via the located access point, or until the termination of the predefined scanning period. The scanning period may also be terminated prior to the conclusion thereof should the device transition from the idle state to the active state in response to, for example, an action of the user of the UE.

In many instances, an access point of the user's home network is within range of the user's UE prior to the completion of the timer, resulting in the user spending unnecessary time roaming on the visited network prior to the completion of the timer. The unnecessary time spent roaming on the visited network may result in an unsatisfactorily reduced quality of experience for the user due to restrictions and limited QoS applied to roaming users of visited networks.

Accordingly, in embodiments disclosed herein, systems and methods for proactively transitioning roaming UE to their home networks are provided. Particularly, a user's UE is provisioned with a roaming transition manager (e.g., from their home network provider or another source) executing on the UE which detects the presence of the UE in one of an idle state and a reduced bandwidth state. In some embodiments, the roaming transition manager actively monitors the current state of the UE such that the roaming transition manager may detect the transition of the UE into the idle state and the reduced bandwidth state at the same time as or immediately following (e.g., within five seconds, within ten seconds, within fifteen seconds) the occurrence of the transition.

As described above, an idle state of the UE refers to a state of the UE in which the UE is not to actively sending or receiving information. Additionally, as used herein, the term "reduced bandwidth state" of UE refers to a state of the UE in which the user is not actively streaming information such as video streaming, audio streaming, or engaging in a phone call using the UE. For example, in the reduced bandwidth state the UE may communicate at least some information including, for example, asynchronous data communication such as check-ins from user applications of the UE which occur in the background without notice from the user.

In addition, in an embodiment, the roaming transition manager executing on the user's UE detects that a signal strength of a roaming connection established between the UE and a visited network of the user is less than a predefined threshold. As used herein, the term "roaming connection" refers to a connection between UE of a user and a visited network of the user whereby the UE roams onto the visited network. The signal strength of the roaming connection may be measured in terms of reference signal received power (RSRP), reference signal received quality (RSRQ), signal-to-interference-plus-noise ratio (SINR), and/or other measures.

In an embodiment, the roaming transition manager, with the UE in one of the idle state and the reduced bandwidth state and in response to the detection of the signal strength of the roaming connection being less than the predefined threshold, triggers the UE to search, using a radio transceiver of the UE (e.g., a radio frequency (RF) transceiver of the UE, such as one or more RF transceiver cards of the UE), for an access node of a home network of the user within range (referred to herein as "within-range access nodes") of the UE. As used herein, the term "within range of the UE" refers to an access node situated with respect to the UE whereby the UE may successfully establish a connection to a network (e.g., a home network of the user) comprising the within-range access node through the within-range access node.

In some embodiments, it may be preferable to require an idle state (rather than an idle state or a reduced bandwidth state) in order to trigger the UE to search for within-range access nodes. For instance, requiring the idle state may provide additional protection for any ongoing voice or data communications. However, in other embodiments, it may be preferable to permit either an idle state or a reduced bandwidth state for triggering the UE to search for within-range access nodes. Particularly, given that the reduced bandwidth state does not encompass situations in which the user has commenced an ongoing synchronous communication session (e.g., a streaming video or music session) subject to disruption, UE in the reduced bandwidth state may be transitioned from the visiting network to the home network without noticeable disruption to the user, thereby providing additional opportunities for returning the respective UE to the home network.

In either embodiment, the UE must be transitioned to one of the idle state and the reduced bandwidth state in order to trigger the UE to search for within-range access nodes. By limiting the rehoming of the UE to situations in which the UE is in one of the idle state and the reduced bandwidth state, noticeable disruptions to the user may be minimized while the efficiency of the process for rehoming the UE is maximized (e.g., by avoiding additional and unnecessary consumption of network processing and power).

In some embodiments, the roaming transition manager may monitor the signal strength of the roaming connection while the UE is still in the active state such that the roaming transition manager may immediately trigger the UE to search or scan for within-range access nodes of the home network at the same time as or immediately following (e.g., within five seconds, within ten seconds, within fifteen seconds) the transition of the UE from the active state into one of the idle state and the limited bandwidth state. Thus, instead of waiting for the completion of a predefined timer as is done conventionally, the roaming transition manager may instead proactively initiate searching for a within-range access node of the user's home network as soon as both: (i) the signal strength of the roaming connection falls below a predefined threshold, and (ii) the UE is in either an idle state or a reduced bandwidth state, thereby minimizing the amount of time spent unnecessarily roaming on the visited network by the UE.

In another embodiment, the roaming transition manager ascertains an identifier of an access node of a visited network through which the UE has established a roaming connection with the visited network. Additionally, the roaming transition manager may identify a location of the respective access node using the identifier of the access node by consulting an access node map. For example, the roaming transition manager (or another function executing on the UE) may query the access node of the visited network through which the roaming connection is established for the identifier of the respective access node in order to identify or determine the identifier of the respective access node. Additionally, the roaming transition manager correlate the identifier of the access node with a location of the access node via the access node map, which may be stored on the UE or remote of the UE and accessed via the access node (e.g., via querying the access node).

In some embodiments, the access node map comprises a lookup table (stored on the UE or remote of the UE) correlating identifiers of the visited network (and potentially other networks including the home network of the user) with locations of the different access points. The location of the access point identified in the access node map may comprise a physical location or an indication of whether or not the respective access node falls within a home network coverage zone of the home network. For instance, the access node map may include a "1" (or similar indication) in reference to a first access node indicating that the first access node resides in a home network coverage zone, and may include a "0" (or similar indication) in reference to a second access node indicating that the second access node does not reside in a home network coverage zone, and so on and so forth.

Alternatively, the access node map may comprise a bitmap, a hexbin map, a polygon map, and the like. In some embodiments, the roaming transition manager may additionally consult a network coverage map (e.g., stored on the UE or remote of the UE and accessed through the access node through which the roaming connection is established) to determine that the location of the access node (e.g., as indicated in a bitmap) falls within a home network coverage zone whereby a connection may be established between the UE and at least one of the access points of the home network. The network coverage map may similarly comprise a bitmap, a hexbin map, a polygon map, and the like.

In addition, the roaming transition manager, with the UE in one of the idle state and the reduced bandwidth state and in response to determining the location of the access node falls within a home network coverage zone of the UE, triggers the UE to search, using the radio transceiver of the UE, for an access node of a home network of the user within range of the UE. Thus, instead of waiting for the completion of a predefined timer as is done conventionally, the roaming transition manager may instead proactively initiate searching for a within-range access node of the user's home network as soon as both: (i) the location of the access node is determined by the roaming transition manager to fall within a home network coverage zone and (ii) the UE is in either an idle state or a reduced bandwidth state, thereby minimizing the amount of time spent unnecessarily roaming on the visited network by the UE.

In another embodiment, the roaming transition manager determines the location of the UE using a location module of the UE. For example, the roaming transition manager may reference a global positioning system (GPS) receiver of the UE to determine the location of the UE. Particularly, in some embodiments, the roaming transition manager may reference an assisted global positioning system (AGPS) receiver of the UE to determine the location of the UE. However, it may be understood that the configuration of the location module may vary in other embodiments and thus may comprise equipment different from GPS or AGPS receivers.

For example, in some embodiments, instead of (or in addition to) utilizing a GPS or AGPS receiver of the UE, the location module of the UE may determine a location vector of the UE corresponding to motion of the UE. Particularly, the location vector may correspond to current motion of the UE or forecasted motion of the UE (e.g., as forecasted by the location module based on prior motion of the UE). In addition, the roaming transition manager of the UE may determine the location of the UE based on the determined location vector of the UE.

The roaming transition manager, with the UE in one of the idle state and the reduced bandwidth state and in response to determining that the location of the UE falls within a home network coverage zone, may initiate the search for a within-range home access node of the home network. For example, the roaming transition manager may determine that the location of the UE falls within a home network coverage zone by consulting a network coverage map (as outlined above) that may be stored on the UE or remote of the UE.

In some embodiments, the roaming transition manager (and/or another component of the UE) terminates the roaming connection between the UE and the visited network in response to locating a within-range access node of the home network, thereby severing the connection between the UE and the visited network. Additionally, the roaming transition manager (and/or another component of the UE) establishes a home connection between the UE and the home network in response to locating the within-range access node of the home network. For example, the UE may establish the home connection between the UE and the home network through the located within-range access node of the home network. Additionally, as used herein, the term "home connection" refers to a connection between the UE of a user and a home network of the user whereby the UE connects to the home network. Thus, instead of waiting for the completion of a predefined timer as is done conventionally, the roaming transition manager may instead proactively initiate searching for a within-range access node of the user's home network as soon as both: (i) the location of the UE is determined by the roaming transition manager to fall within a home network coverage zone and (ii) the UE is in either an idle state or a reduced bandwidth state, thereby minimizing the amount of time spent unnecessarily roaming on the visited network by the UE.

Figure 2:
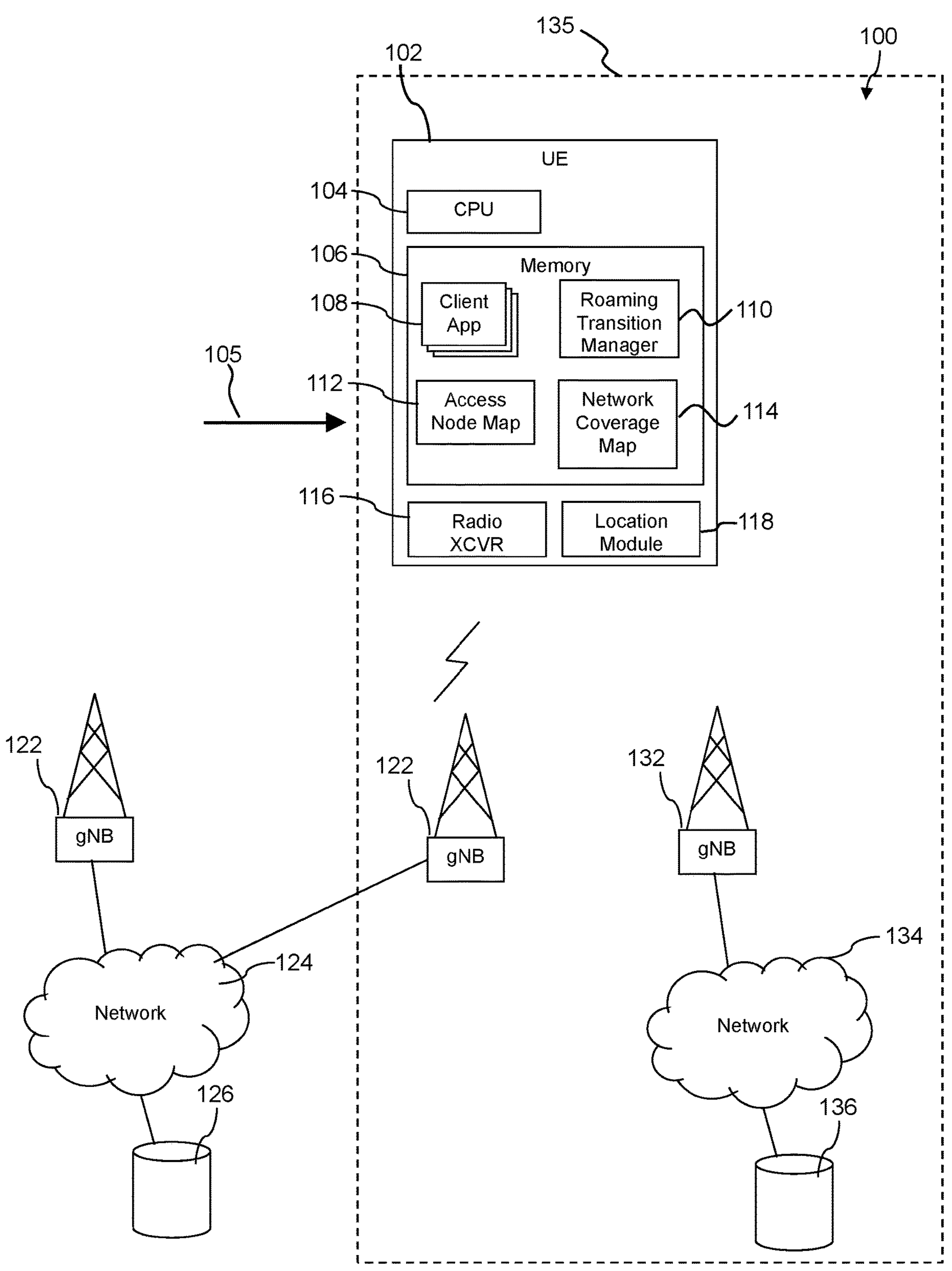

Turning to FIGS. 1 and 2, a communication system 100 is described. In an embodiment, the communication system 100 generally includes an electronic communication device (user equipment—UE) 102, one or more first access nodes 122, a first network 124, a first datastore 126, one or more second access nodes 132, a second network 134, and a second datastore 136. The UE 102 may comprise, for example, a desktop computer, a workstation, a laptop computer, a tablet computer, a smartphone, a wearable computer, an internet of things (IoT) device, and/or a notebook computer.

The first access nodes 122 of communication system 100 corresponds with or is part of the first network 124 which, in this exemplary embodiment, comprises a visited network 124 of the user of UE 102. Depending on the location of UE 102 with respect to a visited network coverage zone of visited network 124, the user may establish a roaming connection with the visited network 124 through the first access nodes 122 (also referred to herein as visited access nodes 122) to provide communication coupling of the UE 102 to the visited network 124. Additionally, the second access node 132 of communication system 100 corresponds to or comprises a component of the second network 134 which, in this exemplary embodiment, comprises a home network 134 of the user of UE 102. Depending on the physical location of UE 102 with respect to a home network coverage zone 135 of home network 134, the user may establish a home connection with the home network 134 through the second access node 132 (also referred to herein as home access node 132).

Access nodes 122 and 132 are configured to establish a connection between UE 102 and their respective networks 124 and 134 according to a 5G protocol, for example 5G, 5G New Radio, or 5G LTE radio communication protocols. Access nodes 122 and 132 may provide communication coupling of the UE 102 to their respective networks 124 and 134 according to a long-term evolution (LTE), a code division multiple access (CDMA), and/or a global system for mobile communication (GSM) radio communication protocol. Access nodes 122 and 132 may each be referred to for some contexts as a gigabit Node B (gNB), an enhanced Node B (eNB), a cell site, or a cell tower. Additionally, while not shown, UE 102 may be communicatively coupled to networks 124 and 134 via a WiFi access point or another non-cellular radio device. Further, while a pair of visited access nodes 122 and a single home access node 132 is illustrated in FIGS. 1 and 2, it is understood that communication system 100 may comprise any number of access nodes 122 and/or 132.

Networks 124 and 134 of communication system 100 (which may be communicatively coupled together) may each comprise one or more public networks, one or more private networks, or a combination thereof. For example, network 124 may comprise a core network, such as a 5G core network. Further details of 5G networks are discussed below with reference to FIGS. 8A, 8B. While shown as communicatively coupled to the visited network 124, first datastore 126 may be considered part of visited network 124 and is illustrated as separate from visited network 124 in FIGS. 1 and 2 to promote discussing their roles with respect to UE 102, as will be discussed further herein. For similar reasons, while shown as communicatively coupled to the home network 134, second datastore 136 may be considered part of home network 134.

UE 102 includes a processor or CPU 104 and a memory 106 in signal communication with the processor 104. Additionally, UE 102 includes one or more client applications 108 stored in a non-transitory portion of the memory 106 and executable by the processor 104. The execution of client applications 108 by a user of UE 102 may generate one or more notifications associated with the client applications 108.

UE 102 additionally includes a roaming transition manager 110 stored in the non-transitory portion of the memory 106 and executable by the processor 104. Particularly, roaming transition manager 110 generally facilitates or manages the UE 102 in transitioning from a roaming connection previously established with the visited network 124 to a home connection with the home network 134.

As an example, FIG. 1 illustrates UE 102 located in a position that is within visited network coverage zone but outside of the home network coverage zone 135. In this position, UE 102 has established a roaming connection to the visited network 124 through the visited access nodes 122. Particularly, UE 102 comprises a RF or radio transceiver 116 configured to establish a wireless communication link with one of the visited access nodes 122 (as well as the home access node 132 when the home access node 132 is within range of the UE 102). In some embodiments, radio transceiver 116 comprises a cellular radio transceiver configured to establish a wireless communication link according to one or more of a 5G, a long-term evolution (LTE), a code division multiple access (CDMA), a global system for mobile communications (GSM) wireless communication protocol.

As shown particularly in FIG. 2, as the user operates UE 102, the user may transport the UE 102 (e.g., along a vector 105 illustrated in FIG. 2) towards and into the home network coverage zone 135 such that the UE 102 enters within range of the home access node 132 whereby UE 102 may establish a wireless communication link with the home access node 132. The roaming transition manager 110 of UE 102 is generally configured to facilitate the UE 102 transitioning from the roaming connection with visited network 124 to a home connection with home network 134 as quickly as practicable once UE 102 is within range of a home access node 132 of the home network 134 to thereby minimize the amount of time (and bandwidth consumed) spent by the UE 102 roaming on the visited network 124.

Particularly, roaming transition manager 110 of UE 102, instead of employing a predefined timer in accordance with conventional practice, employs one or more triggers for automatically triggering the UE 102 to scan or search (e.g., using the radio transceiver 116) for a within-range home access node 132 to establish a home connection with the respective home access node 132. For example, in an embodiment, roaming transition manager 110 of UE 102 monitors a signal strength (e.g., as measured in terms of RSRP, RSRQ, SINR, and the like) of the roaming connection established between UE 102 and visited network 124 (e.g., between radio transceiver 116 of UE 102 and one of the visited access nodes 122). UE 102 may particularly scan the frequency range allocated to the home network 134 when searching for the within-range home access node 132 of home network 134.

In some embodiments, if a within-range home access node 132 cannot be located, UE 102 may search for visited networks which have a higher priority (e.g., in accordance with a roaming list stored in the memory 106 of UE 102) than visited network 124 and thus may search the frequency ranges allocated to these higher priority visited networks. In some instances, it may be preferable to establish a roaming connection with a higher priority visited network over reestablishing the roaming connection with visited network 124.

As roaming transition manager 110 monitors the signal strength of the roaming connection, the roaming transition manager 110 may detect the signal strength being less than a predefined threshold. In addition, roaming transition manager 110 may automatically initiate a rescan or search for a within-range home access node 132 of home network 134 in response to the detected signal strength falling below the predefined threshold if the UE 102 is in one of the idle state and the reduced bandwidth state. In some embodiments, roaming transition manager 110 may initiate a rescan for a within-range home access node 132 in response to the detected signal strength falling below the predefined threshold for a predefined time period. For instance, the roaming transition manager 110 may initiate a timer automatically upon the detected signal strength falling below the predefined threshold, the timer being set for the predefined time period (e.g. 0 to N seconds). The roaming transition manager 110 may then initiate a rescan should the detected signal strength not rise above the threshold prior to the conclusion of the timer.

For instance, roaming transition manager 110 may first detect the signal strength as being less than the predefined threshold but may not automatically initiate the search for a within-range home access node 132 should the UE 102 be in the active state. Instead, roaming transition manager 110 may initiate the search for a within-range home access node 132 once the UE 102 has transitioned into one of the idle state and the reduced bandwidth state should the signal strength remain less than the predefined threshold.

The amount of time spent unnecessarily roaming by the UE 102 on visited network 124 may be minimized by triggering the initiation of the search for a within-range home access node 132 in response to the detected signal strength of the roaming connection falling below the predefined threshold. For instance, the signal strength between of the roaming connection formed between UE 102 and visited network 124 may generally decline as the UE 102 travels towards the home network coverage zone 135. Particularly, the signal strength of the roaming connection will continue to decline as UE 102 travels towards and into home network coverage zone 135 until the signal strength of the roaming connection falls below the predefined threshold, automatically triggering the search for a within-range home access node 132 (should UE 102 be in one of the idle state and the reduced bandwidth state) without needing to wait for the completion of a predefined timer.

In another embodiment, rather than triggering the search for a within-range home access node 132 on the signal strength of the roaming connection, roaming transition manager 110 instead ascertains an identifier of the visited access node 122 through which UE 102 has established the roaming connection with the visited network 124 whereby the roaming transition manager may identify a location of the visited access node 122 by consulting an access node map 112 (e.g., a lookup table stored on the UE 102) which correlates identifiers of access nodes (e.g., access node 122 of visited network 124) with their corresponding location. In this exemplary embodiment, access node map 112 is illustrated in FIGS. 1 and 2 as being stored in a non-transitory portion of the memory 106 of UE 102. However, in other embodiments, access node map 112 may be stored in memory 106 and/or other locations such as datastores 126 and/or 136 of networks 124 and 134.

In some embodiments, the access node map 112 comprises a lookup table in which the location of a respective access node identifier specifies (e.g., in a binary format as a "1" or a "0") whether or not the access node corresponding to the respective access node identifier is located within the home network coverage zone 135 such that a home connection may potentially be established between UE 102 and home network 134.

As an example, FIG. 1 illustrates UE 102 in a location where UE 102 is connected to the visited network 124 via a first visited access node 122 located outside of home network coverage zone 135. In the location of UE 102 illustrated in FIG. 1, roaming transition manager 110 determines through consulting access node map 112 (correlating the identifier of the first visited access node 122 with its corresponding location) that the first visited access node 122 is located outside of home network coverage zone 135 and thus would not initiate the search for a within-range home access node 132.

However, as UE 102 travels towards home network coverage zone 135 as shown particularly in FIG. 2, the roaming connection between UE 102 and visited network 124 is handed off from the first visited access node 122 located outside of home network coverage zone 135 to a second visited access node 122 located within or inside the home network coverage zone 135. In the location of UE 102 illustrated in FIG. 2, roaming transition manager 110 determines through consulting access node map 112 (e.g., correlating the identifier of the second visited access node 122 with its corresponding location) that the second visited access node 122 is located within or inside of home network coverage zone 135 and thus may automatically initiate the search for a within-range home access node 132 should UE 102 be in (or transition into while the UE 102 is connected to the second visited access node 122) one of the idle state and the reduced bandwidth state. In this manner, instead of needing to wait for the completion of a predefined timer, the search for a within-range home access node 132 may commence in response to the roaming transition manager 110 determining that UE 102 is connected to a visited access node 122 located within the home network coverage zone 135.

In some embodiments, instead of comprising a lookup table or similar document, access node map 112 comprises a bitmap, a hexbin map, a polygon map, and the like. In order to determine the location of the visited access node 122, roaming transition manager 110 additionally consults a network coverage map 114 correlating locations of one or more access nodes (e.g., access nodes 122 and/or 132) with home network coverage zone 135 whereby roaming transition manager 110 may determine, based on the ascertained location of the respective visited access node 122, whether or not the respective visited access node 122 resides within the home network coverage zone 135.

In this exemplary embodiment, network coverage map 114 is illustrated in FIGS. 1 and 2 as being stored in a non-transitory portion of the memory 106 of UE 102. However, in other embodiments, network coverage map 114 may be stored in memory 106 and/or other locations such as datastores 126 and/or 136 of networks 124 and 134. Additionally, in some embodiments, maps 112 and 114 comprise separate files or artifacts while in other embodiments maps 112 and 114 may comprise a single file or artifact. For instance, maps 112 and 114 may overly each other or be in some other way combined in a single file or artifact.

In another embodiment, roaming transition manager 110, instead of consulting access node map 112, determines the location of the UE 102 itself using a location module 118 of UE 102. In some embodiments, location module 118 of UE 102 comprises a GPS receiver of the UE 102. In certain embodiments, location module 118 of UE 102 comprises an AGPS receiver of UE 102. In this manner, UE 102 may directly ascertain its geolocation via the location module 118. In some embodiments, roaming transition manager 110 may cross-reference the ascertained geolocation of the visited access node 122 with network coverage map 114 to determine if the geolocation of UE 102 resides within the home network coverage zone 135.

In this manner, instead of waiting for the completion of a predefined timer in accordance with conventional practice, roaming transition manager 110 may initiate a search for a within-range home access node 132 in response to the location of UE 102 (as ascertained or monitored by roaming transition manager 110 via location module 118) entering into home network coverage zone 135 (e.g., as determined by roaming transition manager using network coverage map 114).

In some embodiments, instead of (or in addition to) utilizing a GPS or AGPS receiver of UE 102, the location module 118 of UE 102 may determine a location vector (e.g., arrow 105 illustrated in FIG. 2 may represent a location vector 105 of UE 102) of UE 102 corresponding to motion of the UE 102. Particularly, location vector 105 may correspond to current motion of the UE 102 and/or forecasted motion of UE 102. For instance, location module 118 may forecast the future location of UE 102 based on location vector 105 and/or other positional information of UE 102. The forecasted location of UE 102 may be cross-referenced by roaming transition manager 110 with network coverage map 114 to determine if the forecasted location of UE 102 resides within the home network coverage zone 135.

Figure 3:
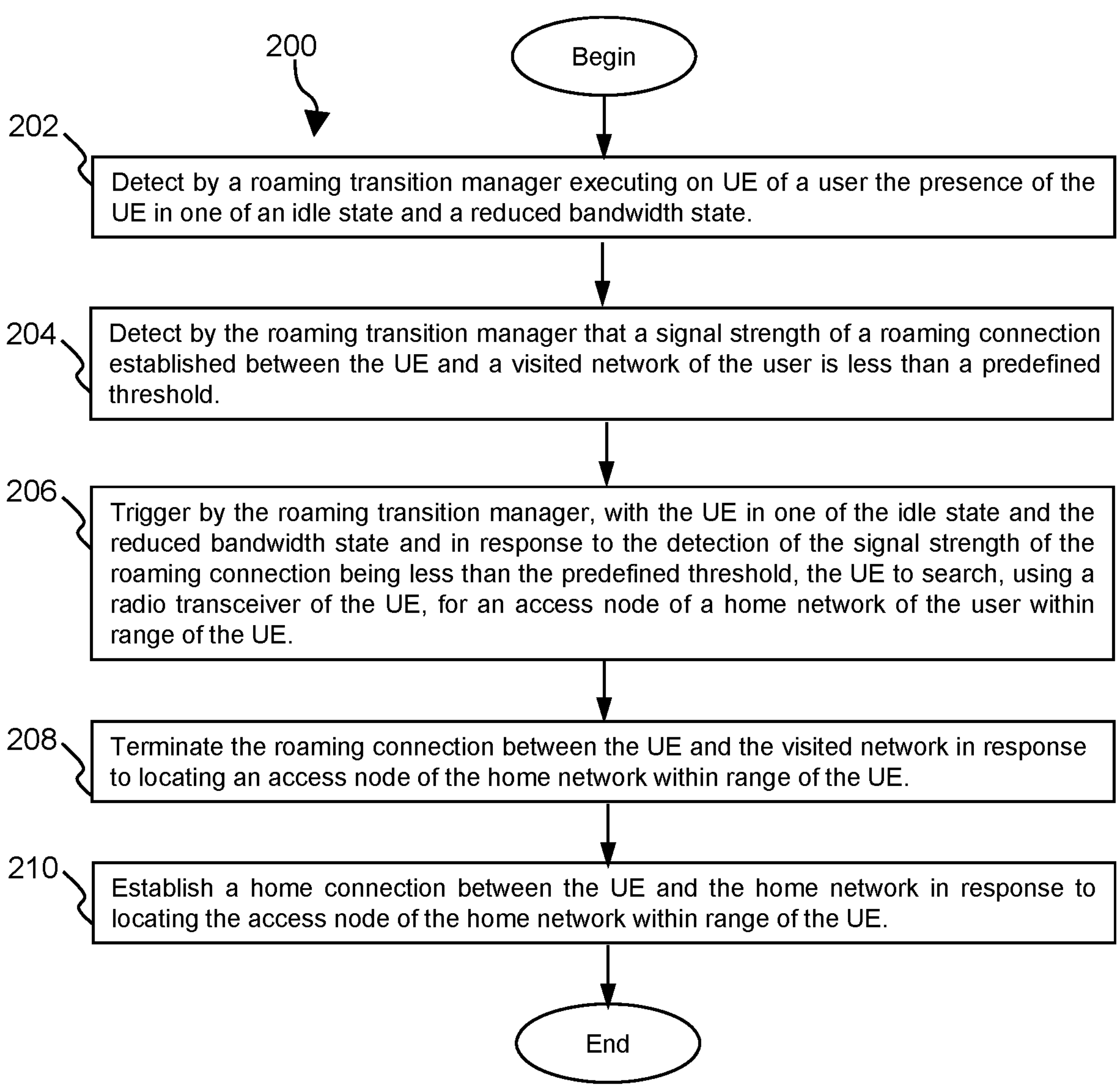
FIG. 3 is a flow chart of a method according to an embodiment of the disclosure.

Turning to FIG. 3, a method 200 is described. In an embodiment, the method 200 is a method for transitioning a roaming UE (e.g., UE 102 illustrated in FIGS. 1 and 2) to its home network (e.g., home network 134 illustrated in FIGS. 1 and 2). At block 202, method 200 comprises detecting by a roaming transition manager (e.g., roaming transition manager 110 illustrated in FIGS. 1 and 2) executing on UE of a user the presence of the UE in one of an idle state and a reduced bandwidth state. At block 204, method 200 comprises detecting by the roaming transition manager that a signal strength of a roaming connection established between the UE and a visited network (e.g., visited network 124 illustrated in FIGS. 1 and 2) of the user is less than a predefined threshold.

At block 206, method 200 comprises triggering by the roaming transition manager, with the UE in one of the idle state and the reduced bandwidth state and in response to the detection of the signal strength of the roaming connection being less than the predefined threshold, the UE to search, using a radio transceiver (e.g., radio transceiver 116 illustrated in FIGS. 1 and 2) of the UE, for an access node (e.g., home access node 132 illustrated in FIGS. 1 and 2) of a home network of the user within range of the UE. At block 208, method 200 comprises terminating the roaming connection between the UE and the visited network in response to locating an access node of the home network within range of the UE. At block 210, method 200 comprises establishing a home connection between the UE and the home network in response to locating the access node of the home network within range of the UE.

Figure 4:
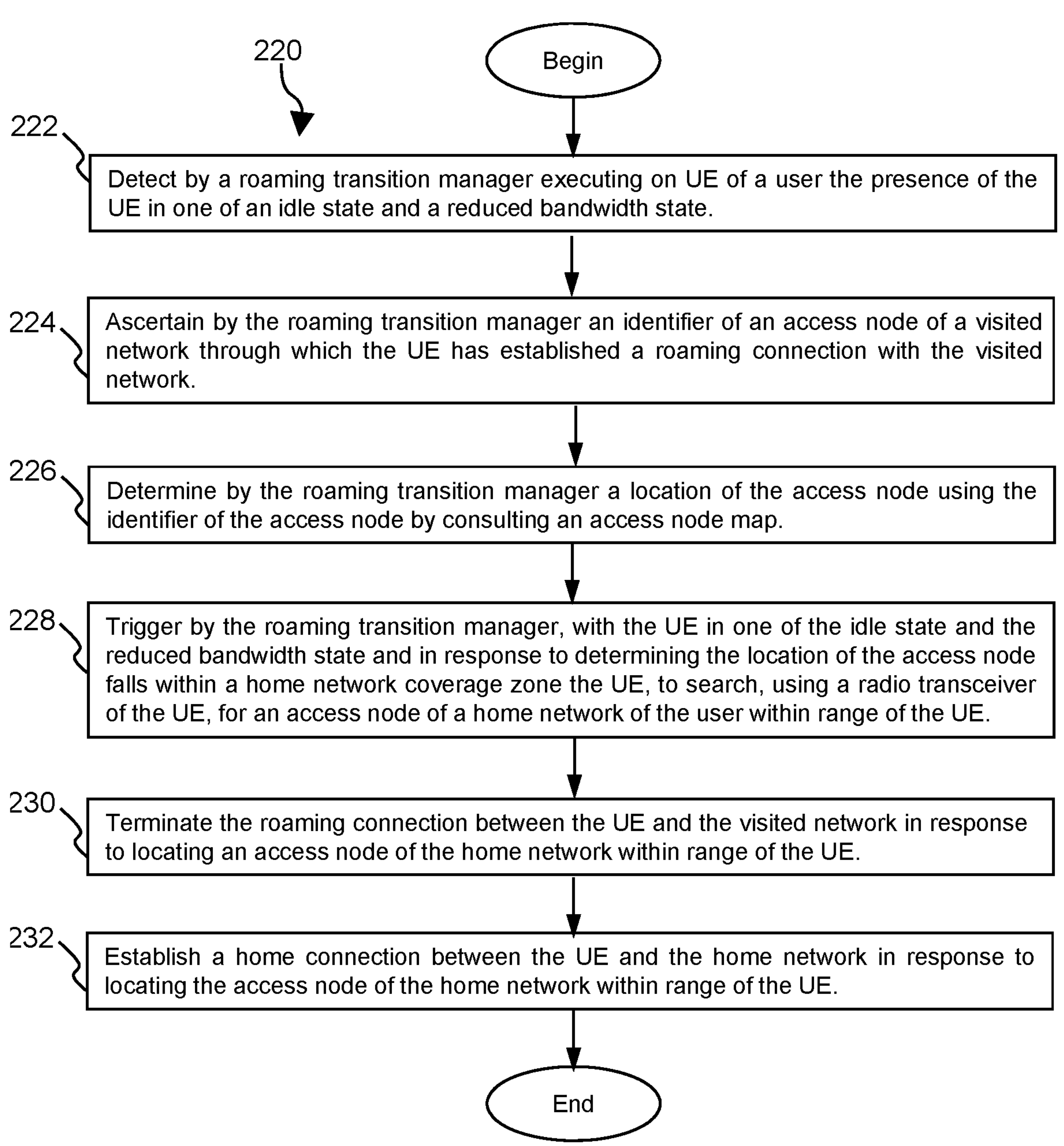
FIG. 4 is a flow chart of another method according to an embodiment of the disclosure.

Turning to FIG. 4, a method 220 is described. In an embodiment, the method 220 is a method for transitioning a roaming UE (e.g., UE 102 illustrated in FIG. 1) to its home network (e.g., home network 134 illustrated in FIG. 1). At block 222, method 220 comprises detecting by a roaming transition manager (e.g., roaming transition manager 110 illustrated in FIGS. 1 and 2) executing on UE of a user the presence of the UE in one of an idle state and a reduced bandwidth state. At block 224, method 220 comprises ascertaining by the roaming transition manager an identifier of an access node (e.g., one of visited access nodes 122 illustrated in FIGS. 1 and 2) of a visited network (e.g., visited network 124 illustrated in FIGS. 1 and 2) through which the UE has established a roaming connection with the visited network. At block 226, method 220 comprises determining by the roaming transition manager a location of the access node using the identifier of the access node by consulting an access node map (e.g., access node map 112 illustrated in FIGS. 1 and 2).

At block 228, method 220 comprises triggering by the roaming transition manager, with the UE in one of the idle state and the reduced bandwidth state and in response to determining the location of the access node falls within a home network coverage zone (e.g., home network coverage zone 135 illustrated in FIGS. 1 and 2) the UE, to search, using a radio transceiver (e.g., radio transceiver 116 illustrated in FIGS. 1 and 2) of the UE, for an access node (e.g., home access node 132 illustrated in FIGS. 1 and 2) of a home network of the user within range of the UE. At block 230, method 220 comprises terminating the roaming connection between the UE and the visited network in response to locating an access node of the home network within range of the UE. At block 232, method 220 comprises establishing a home connection between the UE and the home network in response to locating the access node of the home network within range of the UE.

Figure 5:
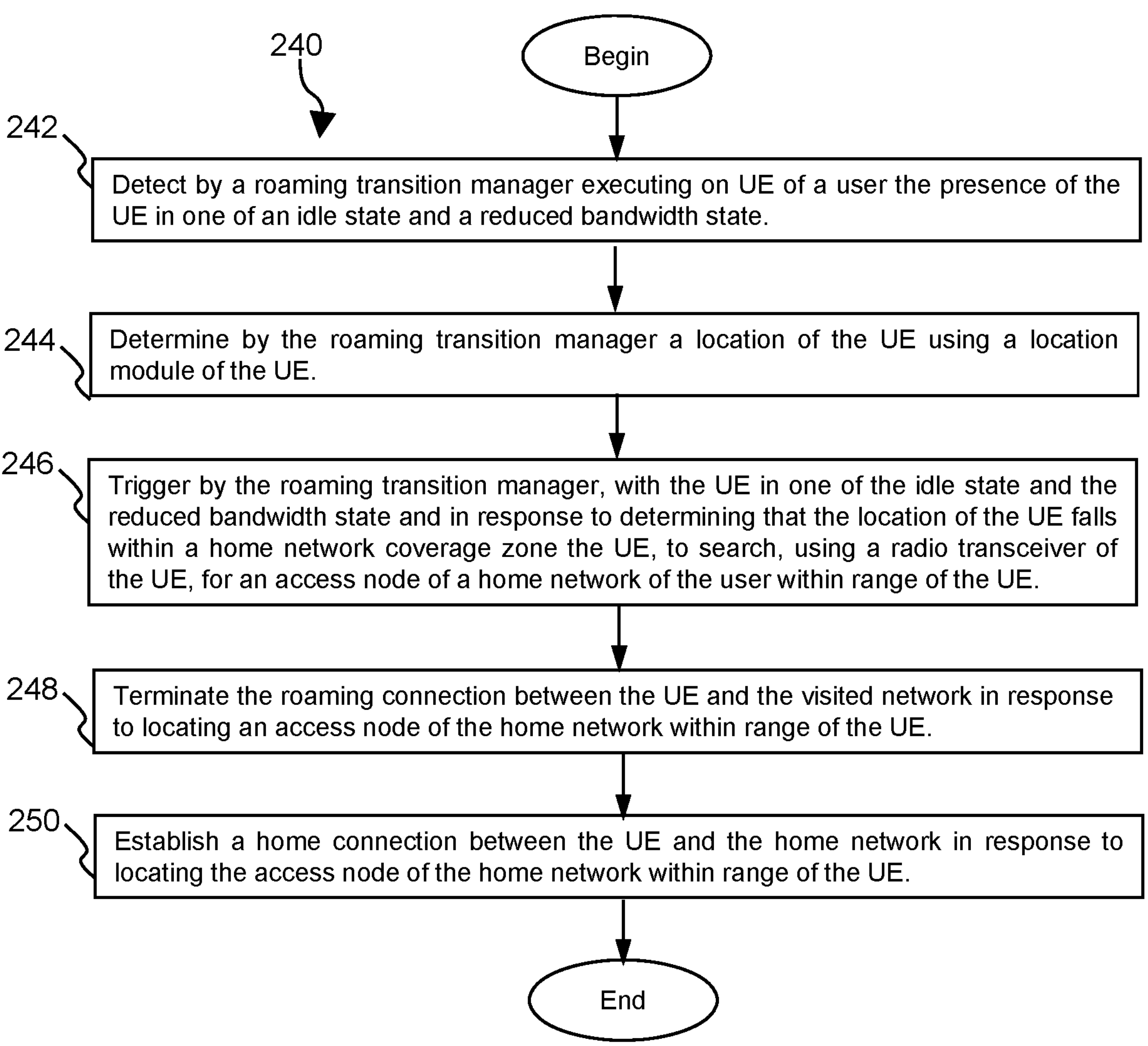
FIG. 5 is a flow chart of another method according to an embodiment of the disclosure.

Turning to FIG. 5, a method 240 is described. In an embodiment, the method 240 is another method for transitioning a roaming UE (e.g., UE 102 illustrated in FIG. 1) to its home network (e.g., home network 134 illustrated in FIG. 1). At block 242, method 240 comprises detecting by a roaming transition manager (e.g., roaming transition manager 110 illustrated in FIGS. 1 and 2) executing on UE of a user the presence of the UE in one of an idle state and a reduced bandwidth state. At block 244, method 240 comprises determining by the roaming transition manager a location of the UE using a location module (e.g., location module 118 illustrated in FIGS. 1 and 2) of the UE.

At block 246, method 240 comprises triggering by the roaming transition manager, with the UE in one of the idle state and the reduced bandwidth state and in response to determining that the location of the UE falls within a home network coverage zone (e.g., home network coverage zone 135 illustrated in FIGS. 1 and 2) the UE, to search, using a radio transceiver (e.g., radio transceiver 116 illustrated in FIGS. 1 and 2) of the UE, for an access node (e.g., home access node 132 illustrated in FIGS. 1 and 2) of a home network of the user within range of the UE. At block 248, method 240 comprises terminating the roaming connection between the UE and the visited network in response to locating an access node of the home network within range of the UE. At block 250, method 240 comprises establishing a home connection between the UE and the home network in response to locating the access node of the home network within range of the UE.

Figure 6:
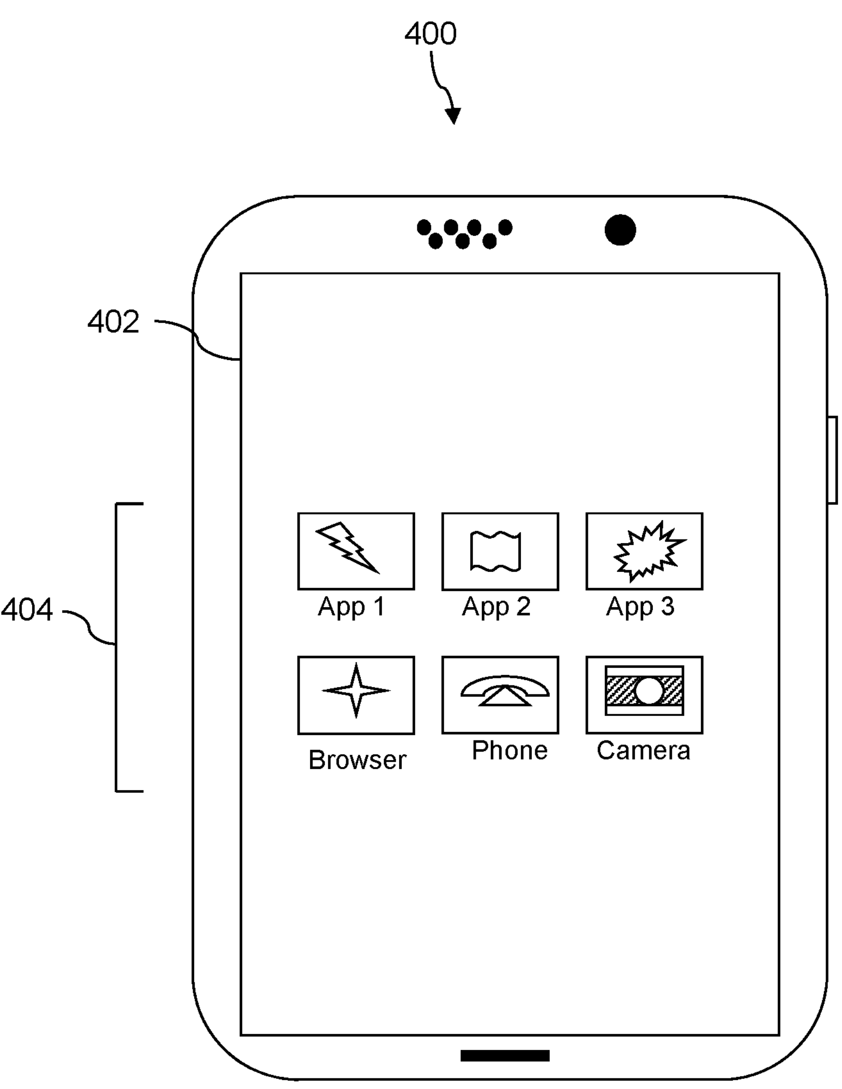
FIG. 6 is a diagram of UE according to an embodiment of the disclosure.

Turning to FIG. 6, UE 400 is depicted which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 7:
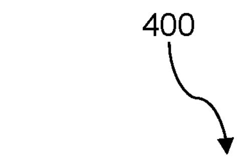
FIG. 7 is a block diagram of the UE of FIG. 6.
Figure 7:
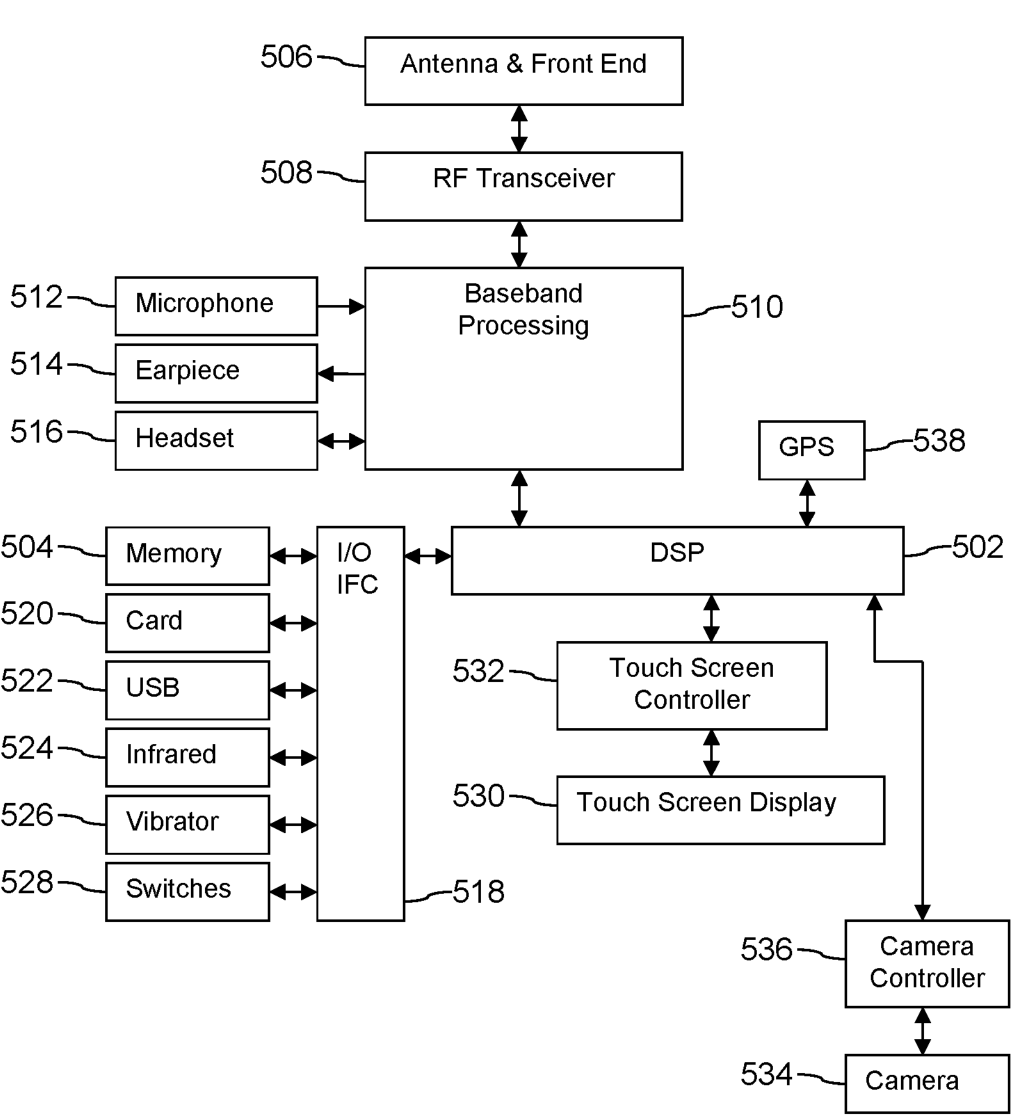

FIG. 7 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long-term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 8A:
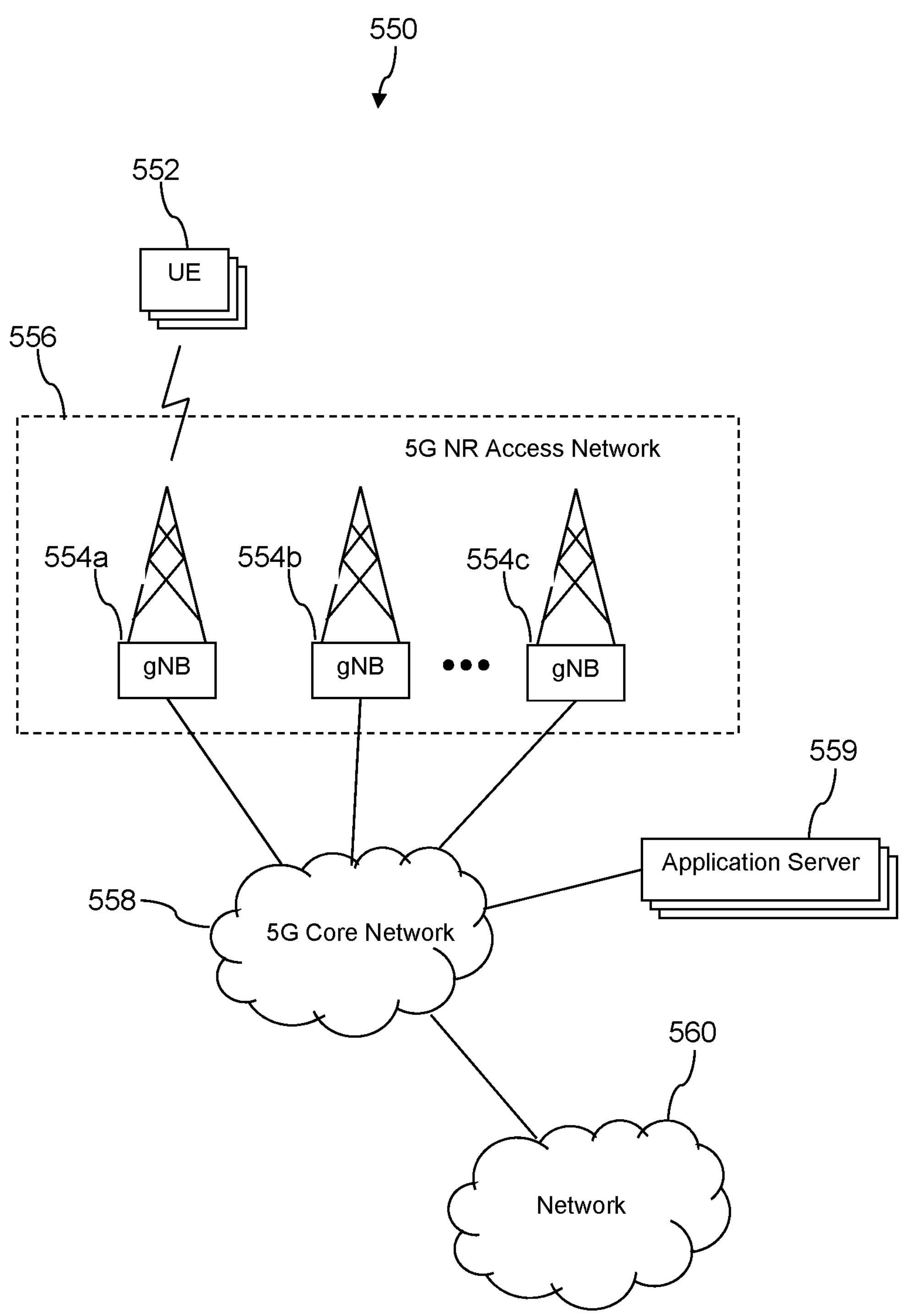
FIG. 8A is a block diagram of another communication system according to an embodiment of the disclosure.

Turning now to FIG. 8A, an exemplary communication system 550 is described. Typically, the communication system 550 includes several access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a next Generation Node B (gNB). In 4G technology (e.g., long-term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554*a*, a second access node 554*b*, and a third access node 554*c*. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long-term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHZ), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 8B:
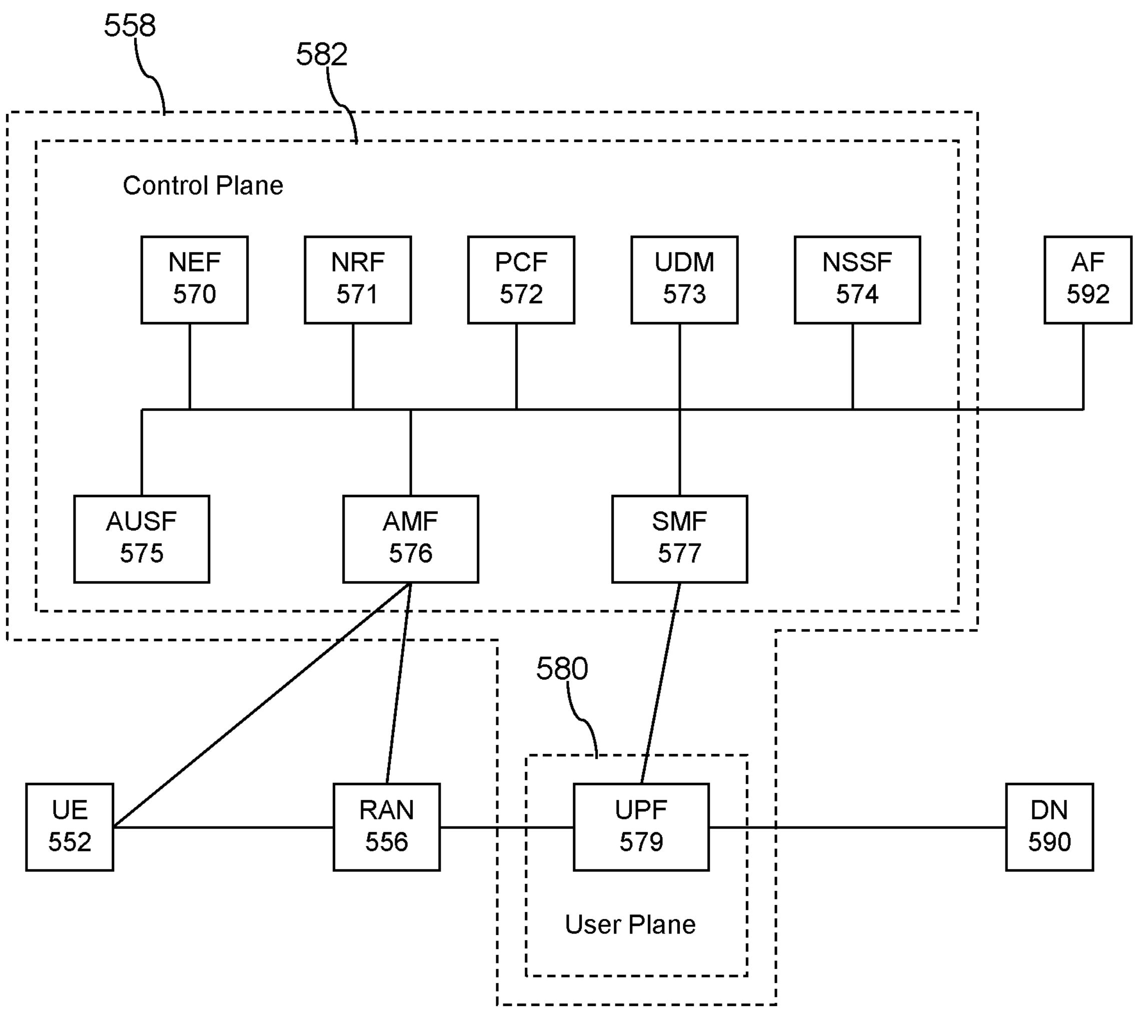
FIG. 8B is a block diagram of a core network of the communication system of FIG. 8A according to an embodiment of the disclosure.

Turning now to FIG. 8B, further details of the core network 558 are described. In an embodiment, the core network 558 is a 5G core network. 5G core network technology is based on a service-based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 8A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 9A:
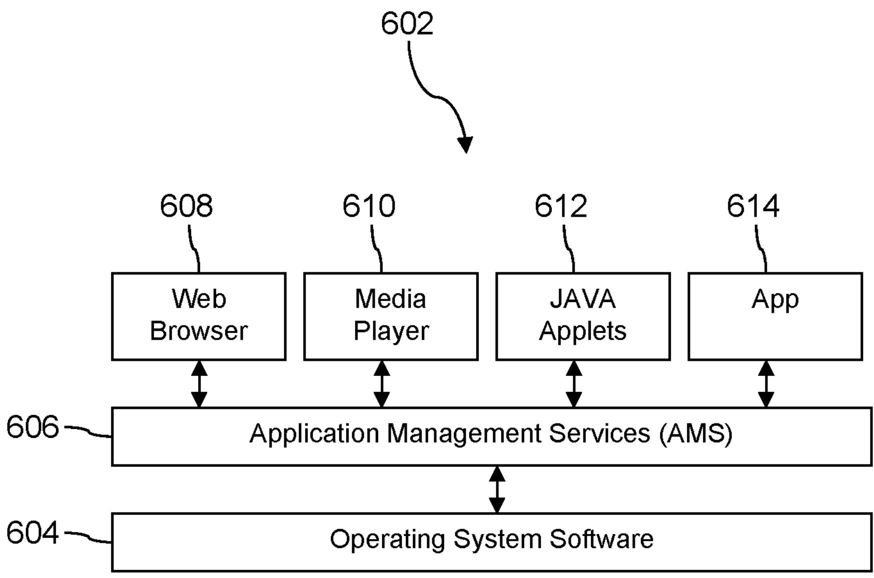
FIG. 9A is a block diagram of a software environment according to an embodiment of the disclosure.

FIG. 9A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 9A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 9B:
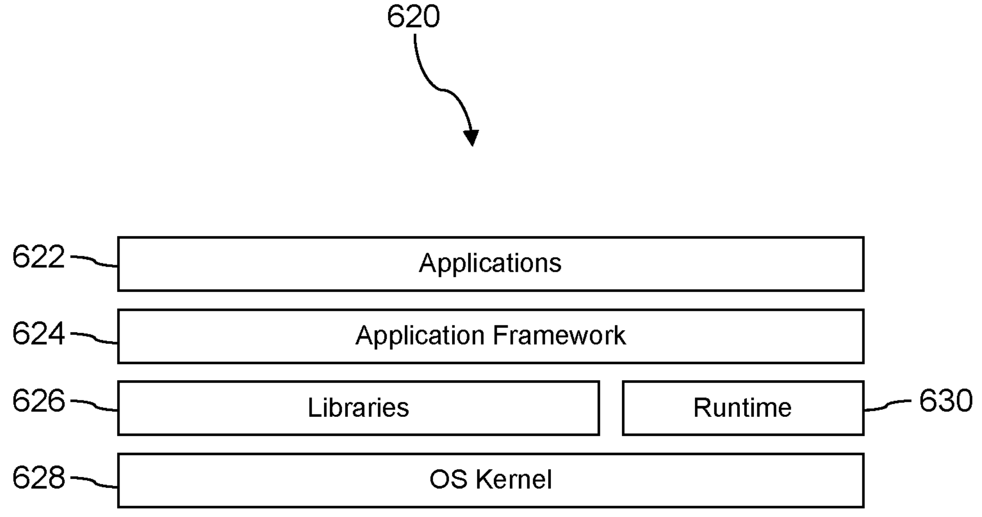
FIG. 9B is a block diagram of another software environment according to an embodiment of the disclosure.

FIG. 9B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 10:
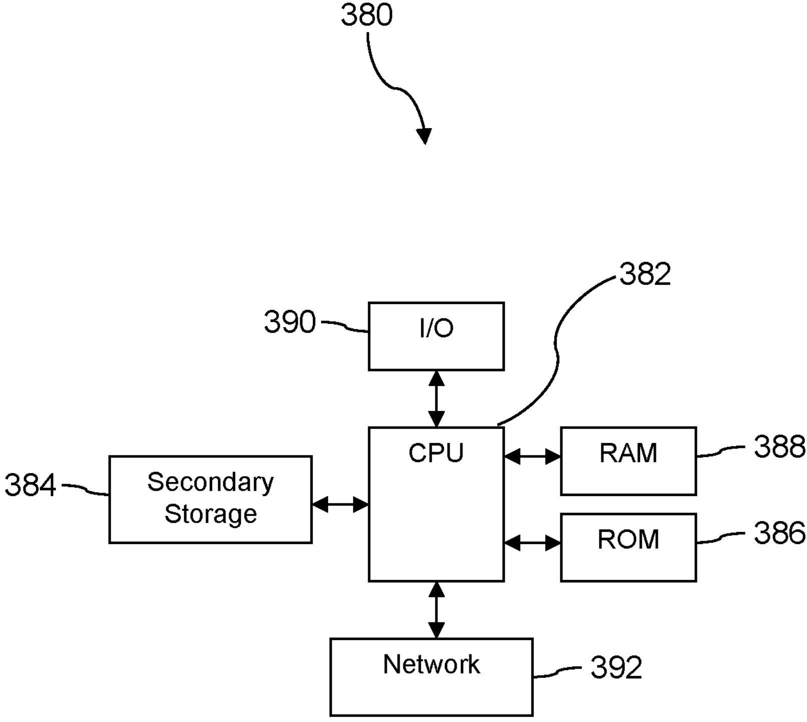
FIG. 10 is a block diagram of a computer system according to an embodiment of the disclosure.

FIG. 10 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC) and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for transitioning a roaming user equipment (UE) to its home network provisioned by a home network provider for communication on the home network, the method comprising:

detecting by a roaming transition manager executing on UE of a user a presence of the UE in one of an idle state or a reduced bandwidth state;

monitoring, by the roaming transition manager, a roaming connection established between the UE and a visited network provisioned by a visited network provider for communication on the visited network, for a trigger action other than expiration of a timer that is initiated upon the UE entering the idle state or reduced bandwidth state, wherein:

the trigger action is that a signal strength of the roaming connection is less than a predefined threshold, and the visited network is different from the home network;

detecting by the roaming transition manager that the signal strength of the roaming connection is less than the predefined threshold;

triggering by the roaming transition manager, with the UE in one of the idle state or the reduced bandwidth state and in response to the detection of the signal strength of the roaming connection being less than the predefined threshold, the UE to search, using a radio transceiver of the UE, for an access node of a home network of the user within range of the UE;

terminating the roaming connection between the UE and the visited network in response to locating an access node of the home network within range of the UE; and establishing a home connection between the UE and the home network in response to locating the access node of the home network within range of the UE.

2. The method of claim 1, wherein the UE is in an active state when the signal strength is detected by the roaming transition manager to be less than the predefined threshold.

3. The method of claim 2, wherein the triggering by the roaming transition manager to search for an access node of the home network within range of the UE occurs following a transition of the UE from the active state to the idle state.

4. The method of claim 1, further comprising:

detecting by the roaming transition manager the presence of the UE in the idle state; and triggering by the roaming transition manager, with the UE in the idle state and in response to the detection of the signal strength of the roaming connection being less than the predefined threshold, the UE to search using the radio transceiver of the UE for an access node of the home network of the user within range of the UE.

5. The method of claim 1, further comprising:

detecting by the roaming transition manager the presence of the UE in the reduced bandwidth state; and triggering by the roaming transition manager, with the UE in the reduced bandwidth state and in response to the detection of the signal strength of the roaming connection being less than the predefined threshold, the UE to search using the radio transceiver of the UE for an access node of the home network of the user within range of the UE.

6. The method of claim 1, further comprising:

detecting by the roaming transition manager that a signal strength of the roaming connection is less than the predefined threshold with the UE in an active state;

initiating by the roaming transition manager a rescan timer upon detection of the signal strength of the roaming connection established between the UE and the visited network of the user being less than the predefined threshold with the UE in the active state;

detecting by the roaming transition manager prior to completion of the rescan timer that the UE has transitioned to one of the idle state or the reduced bandwidth state; and retriggering by the roaming transition manager, in response to detecting the transition of the UE to one of the idle state or the reduced bandwidth state and with the signal strength being less than the predefined threshold prior to completion of the rescan timer, the UE to search, using the radio transceiver of the UE, for an access node of the home network of the user within range of the UE.

7. A user equipment (UE), comprising:

a non-transitory memory;

a processor;

a radio transceiver; and a roaming transition manager stored in the non-transitory memory, that when executed by the processor:

detects a presence of the UE in one of an idle state or a reduced bandwidth state;

monitors a roaming connection established between the UE and a visited network provisioned by a visited network provider for communication on the visited network, for a trigger action other than expiration of a timer that is initiated upon the UE entering the idle state or reduced bandwidth state, wherein the trigger action is that a signal strength of the roaming connection is less than a predefined threshold;

detects that the signal strength of the roaming connection is less than the predefined threshold;

triggers, with the UE in one of the idle state or the reduced bandwidth state or in response to the detection of the signal strength of the roaming connection being less than the predefined threshold, the UE to search, using the radio transceiver, for an access node of a home network of the user within range of the UE, wherein the home network is provisioned by a home network provider for communication on the home network and the home network is different from the visited network;

terminates the roaming connection between the UE and the visited network in response to locating an access node of the home network within range of the UE; and establishes a home connection between the UE and the home network in response to locating the access node of the home network within range of the UE.

8. The UE of claim 7, wherein the UE is in an active state when the signal strength is detected by the roaming transition manager to be less than the predefined threshold.

9. The UE of claim 8, wherein the triggering to search for an access node of the home network within range of the UE occurs following a transition of the UE from the active state to the idle state.

10. The UE of claim 7, wherein the roaming transition manager, when executed by the processor:

detects the presence of the UE in the idle state; and triggers, with the UE in the idle state and in response to the detection of the signal strength of the roaming connection being less than the predefined threshold, the UE to search using the radio transceiver for an access node of the home network of the user within range of the UE.

11. The UE of claim 7, wherein the roaming transition manager, when executed by the processor:

detects the presence of the UE in the reduced bandwidth state; and triggers, with the UE in the reduced bandwidth state and in response to the detection of the signal strength of the roaming connection being less than the predefined threshold, the UE to search using the radio transceiver for an access node of the home network of the user within range of the UE.

12. The UE of claim 7, wherein the roaming transition manager, when executed by the processor:

detects that a signal strength of the roaming connection is less than the predefined threshold with the UE in an active state;

initiates a rescan timer upon the detection of the signal strength of the roaming connection established between the UE and the visited network of the user being less than the predefined threshold with the UE in the active state;

detects prior to completion of the rescan timer that the UE has transitioned to one of the idle state or the reduced bandwidth state; and retriggers, in response to detecting the transition of the UE to one of the idle state or the reduced bandwidth state with the signal strength being less than the predefined threshold prior to completion of the rescan timer, the UE to search, using the radio transceiver of the UE, for an access node of the home network of the user within range of the UE.

13. A method for transitioning a roaming user equipment (UE) to its home network provisioned by a home network provider for communication on the home network, the method comprising:

detecting by a roaming transition manager executing on UE of a user a presence of the UE in one of an idle state or a reduced bandwidth state;

monitoring by the roaming transition manager a roaming connection established between the UE and a visited network provisioned by a visited network provider for communication on the visited network, for a trigger action other than expiration of a timer that is initiated upon the UE entering the idle state or reduced bandwidth state;

detecting by the roaming transition manager the trigger action;

triggering by the roaming transition manager, with the UE in one of the idle state or the reduced bandwidth state and in response to detecting the trigger action, the UE to search, using a radio transceiver of the UE, for an access node of a home network of the user within range of the UE, wherein the home network is different from the visited network;

terminating the roaming connection between the UE and the visited network in response to locating an access node of the home network within range of the UE; and establishing a home connection between the UE and the home network in response to locating the access node of the home network within range of the UE.

14. The method of claim 13, wherein the UE is in an active state when the trigger action is detected by the roaming transition manager.

15. The method of claim 14, wherein the triggering by the roaming transition manager to search for an access node of the home network within range of the UE occurs following a transition of the UE from the active state to the idle state.

16. The method of claim 13, wherein detecting the trigger action comprises detecting that a signal strength of the roaming connection established between the UE and the visited network being less than a predefined threshold.

17. The method of claim 16, further comprising:

detecting by the roaming transition manager that the signal strength of the roaming connection is less than the predefined threshold with the UE in an active state;

initiating by the roaming transition manager a rescan timer upon detection of the signal strength of the roaming connection established between the UE and the visited network of the user being less than the predefined threshold with the UE in the active state;

detecting by the roaming transition manager prior to completion of the rescan timer that the UE has transitioned to one of the idle state or the reduced bandwidth state; and retriggering by the roaming transition manager, in response to detecting the transition of the UE to one of the idle state or the reduced bandwidth state with the signal strength being less than the predefined threshold prior to completion of the rescan timer, the UE to search, using the radio transceiver of the UE, for an access node of the home network of the user within range of the UE.

18. The method of claim 13, wherein detecting the trigger action comprises:

detecting a location of (i) the UE or (ii) an access node using an identifier of the access node; and determining that the location falls within a home network coverage zone.

19. The method of claim 13, wherein detecting the trigger action comprises:

ascertaining an identifier of an access node of the visited network through which the UE has established the roaming connection with the visited network;

determining a location of the access node using the identifier of the access node by consulting an access node map; and determining that the location of the access node falls within a home network coverage zone.

20. The method of claim 13, wherein detecting the trigger action comprises:

determining a location of the UE using a location module of the UE; and determining that the location of the UE falls within a home network coverage zone.

* * * * *